3,770,802
METHOD FOR PREPARING 3-PROPIONYL-SALICYLIC ACID AND DERIVATIVES THEREOF
Enrico Sianesi, Milan, Italy, assignor to Recordati S.a.S. Chemical and Pharmaceutical Company, Lugano, Switzerland
No Drawing. Filed Nov. 16, 1970, Ser. No. 90,016
Claims priority, application Italy, Aug. 1, 1970, 28,190/70
Int. Cl. C07c 69/78
U.S. Cl. 260—473 S          2 Claims

ABSTRACT OF THE DISCLOSURE 3-propionylsalicylic acid is made by isomerising 2-hydroxy - 3 - allylpropiophenone to 2-hydroxy-3-propenylpropiophenone, oxidizing the latter to 3-propionylsalicylic aldehyde and oxidizing the latter to 3-propionylsalicylic acid. This product can be converted to lower alkyl esters which can be used for the production of 3-methylflavone-8-carboxylic acid and its esters, particularly the aminoalkyl esters which are thereapeutically active.

---

This invention relates to a method for preparing a new chemical compound, 3-propionylsalicyclic acid. This compound has been mentioned in U.S. Pat. No. 2,91,070, but without any characteristic allowing it to be identified, and it was later recognized that the method described in that patent for preparing this product did not produce the desired 3-propionylsalicylic acid, but 5-propionylsalicylic acid.

In accordance with this invention, the starting compound is 2-hydroxy-3-allylpropiophenone, a compound already described (Takehoshi et alia, J. Pharm. Soc. Japan, 74, 48, 1954). This compound is first isomerised into 2-hydroxy-3-propenylpropiophenone with an alkali. By oxidizing 2-hydroxy-3-propenylpriophenone with ozone at about 0° C. in a medium which consists of a mixture of formic acid and acetic acid, 3-propionylsalicylic aldehyde is obtained. Finally, the latter compound is subjected to an alkaline fusion to oxidize it into the desired 3-propionylsalicylic acid.

Also in accordance with the invention, 3-propionylsalicylic acid prepared according to the above method is used for the preparation of known derivatives, the lower alkyl esters of 3-methylflavone-8-carboxylic acid. For this purpose, 3-propionylsalicylic acid is converted to a lower alkyl ester, e.g. methyl or propyl ester, preferably ethyl ester, then the ester is cyclised in the presence of sodium benzoate and benzoyl chloride at a temperature of about 180-190° C. The lower alkyl ester of 3-methylflavone-8-carboxylic acid is thus obtained, from which the acid can easily be freed by alkaline saponification. The amount of alkali used for this saponification must not exceed the stoichiometric amount, otherwise the gamma pyrone ring might be broken down.

3-methylflavone-8-carboxylic acid and its lower alkyl esters are useful starting materials for the preparation of esters of this acid with aminoalcohols. These basic esters are known thereapeutical agents, particularly β-piperidinoethyl 3-methylflavone-8-carboxylate, β-morpholinoethyl 3-methylflavone-8-carboxylate, β-diethylaminoethyl 3 - methylflavone - 8 - carboxylate, β-di-n-propylaminoethyl 3-methylflavone-8-carboxylate and β-diisopropylaminoethyl 3 methylflavone-8-carboxylate.

The β-piperidinoethyl ester of 3-methylflavone-8-carboxylic acid, as well as other esters of the same acid with different aminoalcohols, may be prepared by direct esterification, preferably transesterification, by reacting an excess of the corresponding aminoalcohol with the ethyl ester of 3-methylflavone-8-carboxylic acid in the presence of a catalyst such as metallic sodium.

For the preparation of injectable solutions of these basic esters, they should be converted into acid addition salts which are sufficiently water soluble and pharmaceutically acceptable. Whereas β-piperidinoethyl 3-methylflavone-8-carboxylate hydrochloride and tartrate are not very soluble in water and therefore cannot be used for preparing injectable solutions which are sufficiently concentrated to have the required thereapeutic efficiency, other acid addition salts of the above mentioned ester are sufficiently soluble, for instance the phosphate and succinate.

The following examples illustrate the invention.

EXAMPLE 1

3-propionylsalicylaldehyde 24.4 g. of 2-hydroxy-3-propenylpropionphenone, suspended in a mixture of 60 ml. of acetic acid and 30 ml. of 90% formic acid, are ozonised by passing a stream of oxygen (15 litres/hour) containing 7% of $O_3$ through the suspension. The operation is carried out for 4½ hours at 0° C.

When the ozonisation is completed, a stream of pure oxygen is passed during 15 minutes through the solution which is heated to 40–45° C. After maintaining the mixture at 40–45° C. for 15 minutes more, it is slowly poured into water with stirring. A semisolid product separates, which is washed twice by decantation in water; it is taken up with ether and the ether solution is washed with a solution of sodium bicarbonate (by acidifying this solution with HCl, 1.3 g. of 3-propionylsalicylic acid are precipitated), then the ether solution is washed with water and is dried over anhydrous sodium sulfate.

The solvent is evaporated, and the residue is vacuum distilled. 14 g. of the desired product which boils at 130–135° C. (2.5 mm. Hg) and which solidifies on cooling are thus obtained. This product may be used directly for the next step. Total yield 67.2%. The pure product, which melts at 57–59° C., is obtained by crystallization in ligroin.

*Analysis.*—For $C_{10}H_{10}O_3$: Calculated (percent): C, 67.40; H, 5.66. Found (percent): C, 67.65; H, 5.38.

The 2-hydroxy-3-propenylpropiophenone starting compound may be prepared by isomerisation of 2-hydroxy-3-allylpropiophenone, as follows:

To 110 g. of 2-hydroxy-3-allylpropiophenone, dissolved in 156 ml. of diethyleneglycol, are added, with stirring, 49 g. of potassium hyldroxide pellets, the solution is refluxed for 8 hours and then cooled to 20° C. 200 ml. of water and 200 ml. of chloroform are added to the reaction mixture, and it is cautiously neutralised to pH 6–7 with concentrated hydrochloric acid. The mixture is stirred, the lower chloroform layer is collected and the aqueous phase is extracted once more with 70 ml. of chloroform. The solvent is evaporated from the combined chloroform extracts and the residue is crystallized in methanol. 61 g. of the desired product which melts at 82–85° C. are obtained.

EXAMPLE 2

3-propionylsalicylic acid

A well-triturated mixture of 9 g. of 3-propionylsalicylic aldehyde and 10 g. of potassium hydroxide is slowly heated. Already at about 110° C., a fairly rapid evolution of hydrogen is observed. After having gradually heated the mixture for half an hour so as to obtain finally a maximum temperature of 200° C., the mass is allowed to cool completely and taken up with boiling water. The solution is cooled, filtered if necessary and slowly acidified with hydrochloric acid, and the precipitate is collected and washed with a little cold water. After crystallization in dilute alcohol, 8.3 g. of 3-propionylsalicylic acid which melts at 124–125° C. are obtained.

Analysis.—For $C_{10}H_{10}O_4$: Calculated (percent): C, 61.85; H, 5.19. Found (percent): C, 62.32; H, 5.04.

EXAMPLE 3

Ethyl 3-propionylsalicylate 6 g. of 3-propionylsalicylic acid are dissolved in 30 ml. of absolute ethyl alcohol and a little concentrated sulfuric acid is added. The solution is refluxed for 5 hours, it is allowed to cool, diluted with water and extracted with ether. The ether extracts are washed with a 5% solution of sodium bicarbonate, then with water, and then dried over anhydrous sodium sulfate. After evaporating the solvent, 6.0 g. of ethyl 3-propionylsalicylate remain, which may be used directly for the next step; melting point 48–49° C.

Analysis.—For $C_{12}H_{14}O_4$: Calculated (percent): C, 64.85; H, 6.35. Found (percent): C, 64.96; H, 6.62.

EXAMPLE 4

Ethyl 3-methylflavone-8-carboxylate

A mixture of 3.4 g. of ethyl 3-propionylsalicylate, 19 g. of sodium benzoate and 16 g. of benzoyl chloride are heated to 180–190° C. for 8 hours. The reaction mixture is treated with an excess of a chilled 4% solution of $Na_2CO_3$, with vigorous stirring which is continued until a solid product is formed which is washed with water. After crystallization in ligroin, 4.1 g. of ethyl 3-methylflavone-8-carboxylate which melts at 97–99° C. are obtained.

Analysis.—For $C_{19}H_{16}O_4$: Calculated (percent): C, 74.01; H, 5.23. Found (percent): C, 73.80; H, 4.97.

EXAMPLE 5

3-methylflavone-8-carboxylic acid

To 1.23 g. of ethyl 3-methylflavone-8-carboxylate are added 40 ml. of 0.1 N alcoholic potassium hydroxide, and the solution is refluxed for 2 hours. The solution is concentrated to a small volume by evaporation at atmospheric pressure, it is taken up with water, filtered if necessary, and the free acid is precipitated with hydrochloric acid. 1.24 g. of crude acid are obtained which, after crystallization in methyl alcohol, give 1.01 g. of pure acid which melts at 230–233° C.

EXAMPLE 6

3-methylflavone-8-carboxylic acid chloride

A mixture of 56 g. of 3-methylflavone-8-carboxylic acid and 53 g. of thionyl chloride in 500 ml. of benzene is refluxed for 3 hours. Then the benzene is vacuum distilled, further benzene is added to the flask and the last traces of thionyl chloride are removed by another distillation. The desired chloride is thus obtained in a substantially theoretical amount, and it is used directly for the following condensation.

EXAMPLE 7

β-Piperidinoethyl 3-methylflavone-8-carboxylate hydrochloride 50 g. of 3-methylflavone-8-carboxylic acid chloride in 650 ml. of benzene are heated to 50° C., and 22 g. of β-piperidinoethanol are added thereto. The mixture is kept boiling for 3 hours, and then it is cooled and filtered. The product collected on the filter is crystallized in 95% ethyl alcohol, and 61 g. of a product melting at 230–233° C. are obtained.

EXAMPLE 8

β-Piperidinoethyl 3-methylflavone-8-carboxylate hydrochloride 7.29 g. of 3-methylflavone-8-carboxylic acid and 4.79 g. of β-piperidinoethyl chloride hydrochloride are suspended in 100 ml. of isopropanol and, with stirring, 24.9 ml. of 2.09 N methanolic KOH are added to the suspension. The mixture is refluxed for 30 minutes, it is cooled and the solvent is evaporated at the water-bath temperature at a pressure of 15–20 mm. of Hg. The residue is taken up with benzene and some 5% $Na_2CO_3$ solution, and the organic phase is separated. The organic phase is washed with water, dried over anhydrous sodium sulfate and evaporated to dryness at reduced pressure. The base is taken up with ether and, after a treatment with ethanolic hydrochloric acid, the hydrochloride is obtained which, after crystallization in methanol, melts at 230–233° C.

Analysis.—For $C_{24}H_{25}N_4 \cdot HCl$: Calculated (percent): C, 67.62; H, 6.13; N, 3.27; Cl, 8.30. Found (percent): C, 67.54; H, 6.21; N, 3.22; Cl, 8.27.

EXAMPLE 9

β-Piperidinoethyl 3-methylflavone-8-carboxylate 100 mg. of sodium are dissolved in 50 ml. of piperidinoethanol and 6 g. of ethyl 3-methylflavone-8-carboxylate are added to the solution. The mixture is left at room temperature for 24 hours, then it is heated under nitrogen at 90–100° C. and the excess of aminoalcohol and the ethanol formed during the reaction are allowed to distil slowly over approximately 2 hours at a pressure of 7–8 mm. of Hg. The oily residue is dissolved in cold 0.1 N sulfuric acid. The acidic solution is filtered (with charcoal), it is cooled in ice, and gradually treated with an aqueous solution of 5% sodium carbonate, with stirring, until complete precipitation of the base which is recovered, washed and dried. Yield: 6.2 g.; melting at 80–85° C. After crystallization in cyclohexane, the melting point is raised to 85–86° C.

Analysis.—For $C_{24}H_{25}NO_4$: Calculated (percent): C, 73.64; H, 6.44; N, 3.58. Found (percent): C, 73.30; H, 6.68; N, 3.63.

EXAMPLE 10

β-Piperidinoethyl 3-methylflavone-8-carboxylate succinate

A solution of 1.95 g. of β-piperidinoethyl 3-methylflavone-8-carboxylate in 10 ml. of acetone is poured into a solution of 0.59 g. of succinic acid in 20 ml. of warm acetone. The cold mixture is left overnight, the solid which separates is filtered and recrystallized in methylethylketone (or ethyl acetate). Yield: 1.85 g.; two crystalline forms melting at 113–115° C. and 130–132° C. may be obtained. Solubility in water at room temperature: 25%.

Analysis.—For $C_{24}H_{25}NO_4 \cdot C_4H_6O_4$: Calculated (percent): C, 65.99; H, 6.13; N, 2.75. Found (percent): C, 65.94; H, 6.24; N, 2.68.

EXAMPLE 11

Mono-β-piperidinoethyl 3-methylflavone-8-carboxylate orthophosphate 0.01 mole of β-piperidinoethyl 3-methylflavone-8-carboxylate are dissolved in 10 volumes of acetone at room temperature. With vigorous stirring 0.01 mole of $H_3PO_4$ is slowly added as an 85% solution. The desired salt precipitates immediately in a sticky form, and with vigorous stirring, it is fairly quickly converted to a crystalline form. It is cooled to 0° C. to complete the precipitation, filtered off, washed with a little acetone, and vacuum-dried. This crude product is crystallized once in absolute methanol and a while crystalline product melting at 194–195° C. is obtained. Yield: 3.0 g. The solubility of this salt in water at room temperature is 25%.

I claim:

1. A method for preparing 3-propionylsalicylic acid wherein 2-hydroxy-3-allylpropiophenone is treated with alkali to convert it to 2-hydroxy-3-propenylpropionphenone, the latter is oxidized with ozone at a temperature of about 0° C. in a reaction medium which consists of a mixture of formic acid and acetic acid to produce 3-propionylsalicylic aldehyde, then the latter is subjected to an alkaline fusion to oxidize it to 3-propionylsalicylic acid.

2. A method according to claim 1, wherein the 3-propionylsalicylic acid is reacted with a lower alkanol to form the lower alkyl ester of said acid.

References Cited
UNITED STATES PATENTS 2,921,070   1/1960   Dare _____ 260—345.2
3,113,962   12/1963   Buzas _____ 260—521 R

OTHER REFERENCES

Fadia et al.: C.A. 50 4074c (1956).
March: "Advanced Organic Chemistry," McGraw-Hill Book Co. (1968) pp. 454, 872, 908.
Brewster et al.: "Organic Chemistry," Prentice-Hall, Inc. (1961) p. 244.

JAMES A. PATTEN, Primary Examiner

J. F. TERAPANE, Assistant Examiner

U.S. Cl. X.R.

260—247.2, 293.58, 345.2, 521 R, 524 M, 592

UNITED STATES PATENT OFFICE
CERTIFICATE OF CORRECTION

Patent No. 3,770,802            Dated November 6, 1973

Inventor(s) Enrico SIANESI

It is certified that error appears in the above-identified patent and that said Letters Patent are hereby corrected as shown below:

column 1, line 5:    "RECORDATI S.a.S" should read

"RECORDATI S.A."

column 1, line 28:   "No. 2,91,070" should read

"No. 2,921,070"

column 1, line 36:   "(Takehoshi" should read

"(Takahoshi"

column 1, line 39:   "2-hydroxy-3-propenylpriophenone" should read

"2-hydroxy-3-propenylpropiophenone"

column 4, lines 73-74: "2-hydroxy-3-propenylpropionphenone"

should read

"2-hydroxy-3-propenylpropiophenone"

column 5, line 11:   "Dare" should read

"Da Re"

Signed and sealed this 4th day of June 1974.

(SEAL)
Attest:

EDWARD M. FLETCHER, JR.                C. MARSHALL DANN
Attesting Officer                        Commissioner of Patents